G. GUADAGNI.
APPARATUS FOR THE MANUFACTURE OF ARTIFICIAL SILK.
APPLICATION FILED JUNE 14, 1909.

977,863.

Patented Dec. 6, 1910.
2 SHEETS—SHEET 1.

Witnesses.
Jesse N. Lutton
R.V. Sommers

Inventor.
Giuseppe Guadagni
by
Atty.

G. GUADAGNI.
APPARATUS FOR THE MANUFACTURE OF ARTIFICIAL SILK.
APPLICATION FILED JUNE 14, 1909.
977,863.
Patented Dec. 6, 1910.
2 SHEETS—SHEET 2.
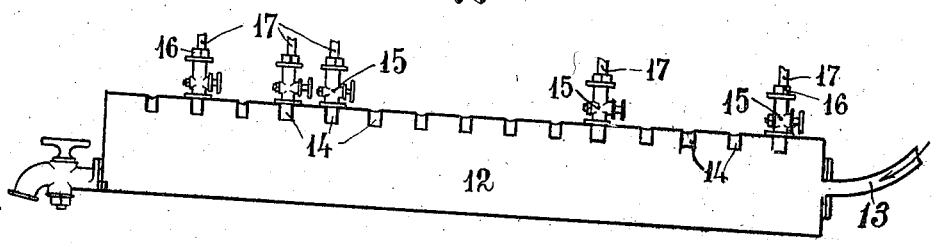
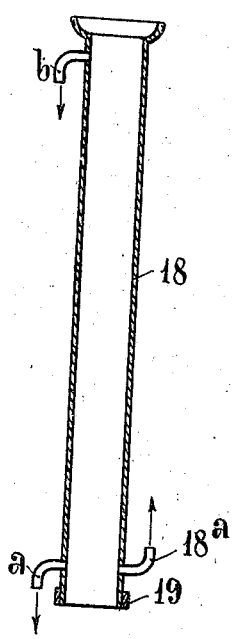
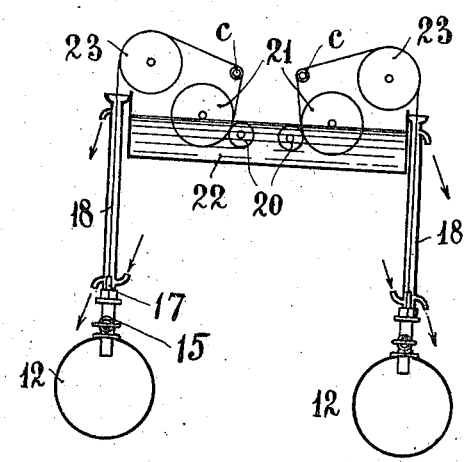
Witnesses.
Inventor.
Giuseppe Guadagni

UNITED STATES PATENT OFFICE.

GIUSEPPE GUADAGNI, OF PAVIA, ITALY.

APPARATUS FOR THE MANUFACTURE OF ARTIFICIAL SILK.

977,863.  Specification of Letters Patent.  Patented Dec. 6, 1910.

Original application filed July 15, 1908, Serial No. 443,655. Divided and this application filed June 14, 1909. Serial No. 502,065.

*To all whom it may concern:*

Be it known that I, GIUSEPPE GUADAGNI, a subject of the King of Italy, residing at Pavia, Italy, have invented certain new and useful Improvements in Apparatus for the Manufacture of Artificial Silk; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the manner of actuating my process for the manufacture of artificial silk from cellulose described in my patent application Ser. No. 443,655 filed July 15, 1908, of which the present application is a division and which has for its object to reduce considerably the duration of the operations incident to its manufacture and the cost of the product, and at the same time produce an article superior to that at present made.

Figure 1:
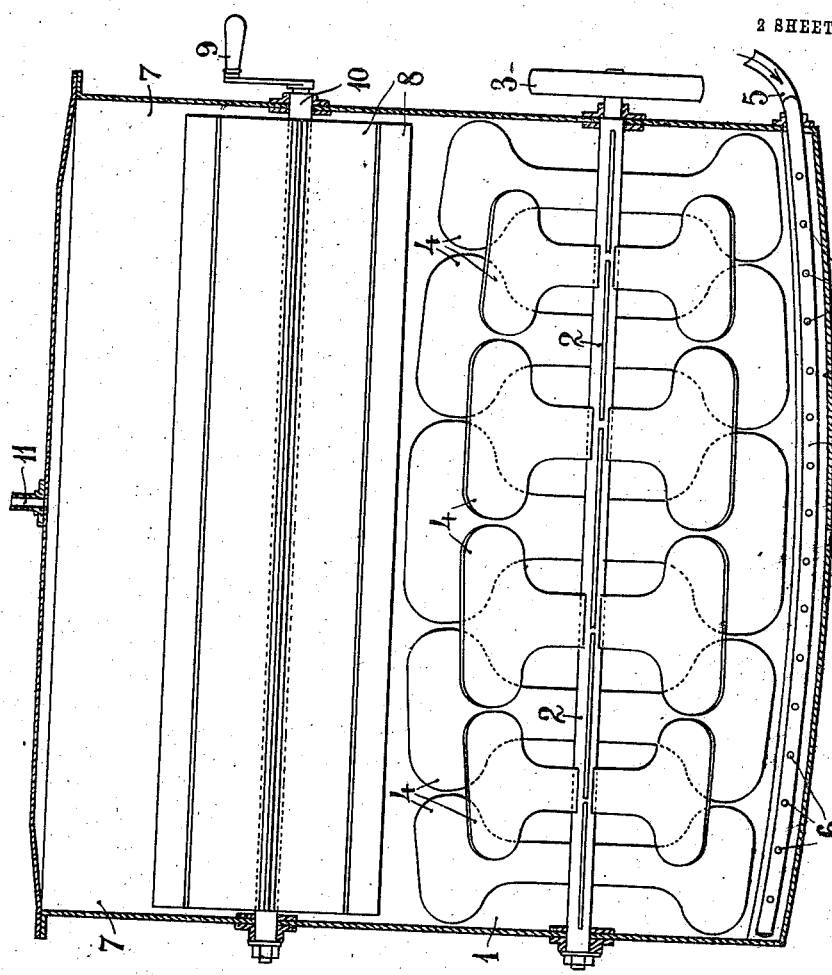
Figure 2:
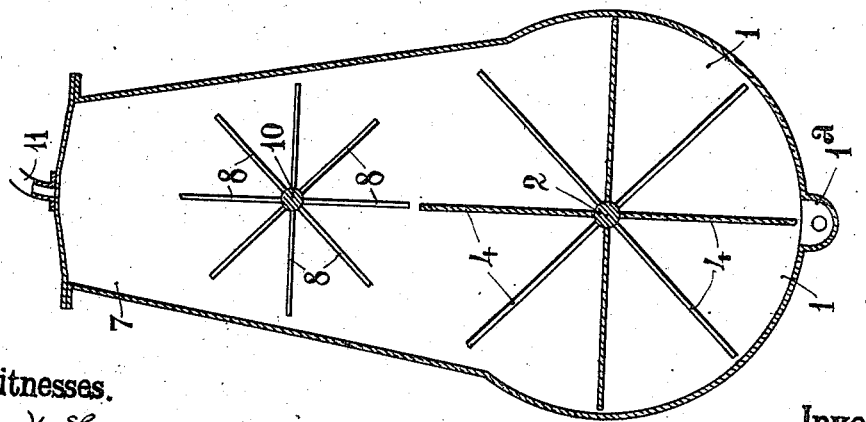

Referring to the drawings in which like parts are similarly designated: Figure 1 is a longitudinal vertical section and Fig. 2 is a transverse vertical section of the vessel in which the cellulose is dissolved. Fig. 3 is a view partly in longitudinal section showing the filament forming device. Fig. 4 is an enlarged view in section, of a tube for containing the hardening liquid. Fig. 5 is a view partly in section showing the manner of forming, winding and washing the filaments.

In carrying out my invention I dispense with the customary washing of the cellulose in caustic soda, chlorin or other solution of oxidizing agents, that have for their object to render the cellulose more solvent in the cupro-ammonium solvent of the cellulose known in the trade as Schweitzer's solution.

According to my invention I wash the cellulose one or more times in water and expel the excess of water by compressing it in a suitable press or in any other manner and then card the same. The cellulose is then ready to be dissolved and is placed in a suitable vessel containing at its bottom the cupro-ammonium solution and at its top the cellulose. Such a vessel suitable for carrying out the present invention is shown in Figs. 1 and 2 and comprises a lower cylindrical section 1 in which is mounted a shaft 2 provided with agitator blades 4 and a pulley 3 mounted on shaft 2 for driving the same. Below the agitator blades I form in the cylindrical portion 1 a depression or gutter 1ª in which lies a pipe 5 supplied with compressed air, said pipe having lateral exit orifices 6. Above the cylindrical portion is a chamber 7 provided preferably with a rotatable bottom comprising a shaft 10 on which is mounted a number of vanes 8. The shaft 10 is provided with a suitable crank 9 or equivalent device for rotating the same and by doing so the cellulose can be uniformily fed into the solution chamber 1. The entire vessel is closed by a tight cover having an exit pipe 11 which is preferably conducted to an absorbent of ammonia. The carded cellulose containing some moisture is placed in the chamber 7 on the rotatable bottom thereof. Compressed air is forced through the pipe 5 into the cupro-ammonium solution which is agitated by the blades 4 and some of the ammonium gas from said solution is carried up through the carded cellulose and out through the pipe 11 while the cellulose is caused to drop into the liquid solvent by rotating by means of the crank 9 the vanes 8 and is constantly stirred therein by the agitator blades 4.

Heretofore the solution of the cellulose in the cupro-ammonium liquor has been carried out at a low temperature and such temperature has been maintained somewhere in the neighborhood of six degrees centigrade. I have found that it is not necessary to provide special cooling means for the solution vessel. A sufficient low degree of temperature being maintained by the passage of the compressed air coming from the tube 5 and flowing through the cupro-ammonium solution, a portion of the ammonia contained in this latter is evaporated thus realizing the desired lowering of the temperature of the cupro-ammonium solution. The ammonium gases issuing from the cupro-ammonium solution are carried upward by the air forced through pipe 5 and orifices 6 past the movable bottom 8 into the body of the cellulose contained in chamber 7 and saturates the moist cellulose with ammonium. This renders the cellulose readily attackable by the cupro-ammonium solution and prevents the moist cellulose contained in the reservoir 7 from precipitating the copper oxid from the cupro-ammonium solution when coming into contact therewith, by reason of the water contained in the cellulose and thereby retard considerably the operation. Moreover the further incoming air causes a portion of the ammonia absorbed by the cellulose to evaporate and produces therefore a cooling of this latter, which is then ready to be brought into contact with the cupro-ammonium solution below, which is also cooled at the desired degree. This is obtained by turning the rotatable bottom 8 and then causing the cellulose to fall into the chamber 1. By the action of the agitator blades 4 a spinable solution of cellulose containing from 9–10% of cellulose will be obtained in a couple of hours. The residue of the ammonium gases having passed through the vessel 7 passes out through pipe 11 into a suitable collector not shown. The colloidal solution of cellulose thus obtained is filtered through a filter of any desired construction and is then caused to pass under pressure through capillary orifices where it encounters an acid coagulant. This coagulant consists, as described in my patent application Ser. No. 443,655 above referred to, of a mixture of sulfuric and hydrochloric acid, in such quantities that the total acidity of the bath be sufficient to transform entirely into salts the ammonia and the copper introduced in the stirring cylinder; thus the greatest economy is obtained and the work of recuperation is reduced to a minimum. The colloidal solution of cellulose after filtering is forced by means of the pressure of the air or gravity from tanks (not shown), through a pipe 13 which connects the tanks to a container 12 provided with nipples 14 on which are mounted filament formers 16 having capillary tubes 17 and controlling valves 15. Mounted on each of the filament formers are glass tubes 18 provided with suitable packing rings 19 at their lower ends. In these glass cylinders are contained the coagulant, the capillary tubes 17 projecting above the lower ends of said tubes and the inlet pipes 18$^a$ therefor.

When the apparatus works, the coagulant is fed into them at connection 18$^a$ rises in the tubes 18 and overflows at $b$. When one of the capillary tubes 17 cannot work, the discharge $b$ is closed and the discharge $a$ is opened; the coagulant is thus discharged without rising in the tube 18. The filament being of less gravity than the coagulant and being forced under pressure through the capillary tubes, rises to the surface of the coagulant. It is then passed over a guide drum 23 positioned so that it is tangent to the center lines of the tube 18. The filament then passes over a guide roll $c$ and between a drum 21 and a bobbin 20 being wound upon said bobbin. The bobbin is immersed in running water contained in a suitable tank 22, preferably lead lined. The drum 21 is driven and rotates the bobbins by means of peripheral friction extended by drum 21 not on lateral end disks or other parts of the bobbin but on the thread itself while being wound on the bobbin. This permits the maintenance of the uniform thickness imparted to the filaments by the drawing drum 23 and the thread is always equally and constantly titrated. Drums 21 and 23 are necessarily of the same diameter and perform the same number of turns or otherwise the thread would not be wound on the bobbin regularly and tension would be placed on the filament after it was coagulated which would be apt to break it if 21 were run faster than 23. The drum 23 serves to place tension on the thread as it is being formed and the amount of tension determines the thickness of the filaments. After the bobbins 20 have a filament wound on them of a thickness from 10 to 15 millimeters they are removed while still moist to a suitable twisting machine where they are twisted into threads and wound into skeins. When dried under tension the brilliancy is maintained even after subsequent washing.

I claim:

1. In an apparatus of the character described, a closed chamber, means for supplying compressed air to the bottom of the chamber, revoluble agitator blades mounted in the latter above the air supply, a rotatable platform mounted in the chamber above said blades for the reception of the moist cellulose, and a pipe at the top of said chamber for the discharge of the ammonia.

2. An apparatus of the character described comprising a closed chamber having a lower cylindrical portion provided with a gutter in its bottom, a perforated pipe mounted in said gutter to supply air under pressure to the cupro-ammonium solution contained in said cylindrical portion, a horizontal rotatable shaft mounted in the latter, agitator blades on the shaft extending into the solution, a revoluble platform for the reception of moist cellulose mounted in the chamber above said blades and partially separating the lower part of the chamber from the upper part, means outside the chamber for revolving the platform, and a pipe at the top of the chamber for the discharge of ammonia from the latter.

In testimony that I claim the foregoing as my invention, I have signed my name in presence of two subscribing witnesses.

GIUSEPPE GUADAGNI.

Witnesses:
 FRANCESCO SIMONI,
 CESCA TAOLO.